United States Patent
Holz (10) Patent No.: US 10,609,285 B2
(45) Date of Patent: Mar. 31, 2020

(54) POWER CONSUMPTION IN MOTION-CAPTURE SYSTEMS

(71) Applicant: Leap Motion, Inc., San Francisco, CA (US)

(72) Inventor: David Holz, San Francisco, CA (US)

(73) Assignee: Ultrahaptics IP Two Limited, Bristol (GB)

(*) Notice: Subject to any disclaimer, the term of this patent is extended or adjusted under 35 U.S.C. 154(b) by 69 days.

(21) Appl. No.: 14/149,663

(22) Filed: Jan. 7, 2014

(65) Prior Publication Data

US 2014/0192206 A1    Jul. 10, 2014

Related U.S. Application Data

(60) Provisional application No. 61/749,638, filed on Jan. 7, 2013.

(51) Int. Cl.
H04N 5/225 (2006.01)
H04N 5/232 (2006.01)

(52) U.S. Cl.
CPC .................. *H04N 5/23241* (2013.01)

(58) Field of Classification Search
CPC ... H04N 13/0296; G06F 3/017; G06F 3/0425; G06F 3/0304; G06F 3/04815; G06F 1/1686; G06F 3/0346; G06F 2200/1633; G06F 3/005
USPC ........................................ 348/155, 208, 169
See application file for complete search history.

(56) References Cited

U.S. PATENT DOCUMENTS

| | | | |
|---|---|---|---|
| 2,665,041 A | 1/1954 | Maffucci | |
| 4,175,862 A | 11/1979 | DiMatteo et al. | |
| 4,879,659 A | 11/1989 | Bowlin et al. | |
| 5,134,661 A | 7/1992 | Reinsch | |
| 5,282,067 A | 1/1994 | Liu | |
| 5,434,617 A | 7/1995 | Bianchi | |
| 5,454,043 A | 9/1995 | Freeman | |

(Continued)

FOREIGN PATENT DOCUMENTS

| | | |
|---|---|---|
| CN | 1984236 A | 6/2007 |
| CN | 201332447 Y | 10/2009 |

(Continued)

OTHER PUBLICATIONS

PCT/US2013/069231—International Search Report and Written Opinion (Corrected Version), dated Mar. 13, 2014 (received date Mar. 20, 2014), 7 pages.
U.S. Appl. No. 13/744,810—Non Final Office Action dated Jun. 7, 2013, 15 pages.
U.S. Appl. No. 13/744,810—Final Office Action dated Dec. 16, 2013, 18 pages.
PCT/US2013/021713—International Search Report and Written Opinion, dated Sep. 11, 2013, 7 pages.

(Continued)

*Primary Examiner* — Masum Billah
(74) *Attorney, Agent, or Firm* — Haynes Beffel & Wolfeld, LLP; Ernest J. Beffel, Jr.; Paul A. Durdik (57) ABSTRACT

The technology disclosed relates to reducing the overall power consumption of motion-capture system without compromising the quality of motion capture and tracking In general, this is accomplished by operating the motion-detecting cameras and associated image-processing hardware in a low-power mode unless and until a moving object is detected. Once an object of interest has been detected in the field of view of the cameras, the motion-capture system is "woken up," i.e., switched into a high-power mode, in which it acquires and processes images at a frame rate sufficient for accurate motion tracking.

15 Claims, 3 Drawing Sheets

(56) References Cited

U.S. PATENT DOCUMENTS

| | | |
|---|---|---|
| 5,455,561 A | 10/1995 | Brown |
| 5,493,618 A | 2/1996 | Stevens et al. |
| 5,574,511 A | 11/1996 | Yang et al. |
| 5,581,276 A | 12/1996 | Cipolla et al. |
| 5,594,469 A | 1/1997 | Freeman et al. |
| 5,691,737 A | 11/1997 | Ito et al. |
| 5,742,263 A | 4/1998 | Wang et al. |
| 5,900,863 A | 5/1999 | Numazaki |
| 5,940,538 A | 8/1999 | Spiegel et al. |
| 6,002,808 A | 12/1999 | Freeman |
| 6,031,161 A | 2/2000 | Baltenberger |
| 6,031,661 A | 2/2000 | Tanaami |
| 6,072,494 A | 6/2000 | Nguyen |
| 6,075,895 A | 6/2000 | Qiao et al. |
| 6,144,366 A | 11/2000 | Numazaki et al. |
| 6,147,678 A | 11/2000 | Kumar et al. |
| 6,154,558 A | 11/2000 | Hsieh |
| 6,181,343 B1 | 1/2001 | Lyons |
| 6,184,326 B1 | 2/2001 | Razavi et al. |
| 6,184,926 B1 | 2/2001 | Khosravi et al. |
| 6,195,104 B1 | 2/2001 | Lyons |
| 6,204,852 B1 | 3/2001 | Kumar et al. |
| 6,252,598 B1 | 6/2001 | Segen |
| 6,263,091 B1 | 7/2001 | Jain et al. |
| 6,417,970 B1 | 7/2002 | Travers et al. |
| 6,492,986 B1 | 12/2002 | Metaxas et al. |
| 6,493,041 B1 | 12/2002 | Hanko et al. |
| 6,498,628 B2 | 12/2002 | Iwamura |
| 6,578,203 B1 | 6/2003 | Anderson, Jr. et al. |
| 6,603,867 B1 | 8/2003 | Sugino et al. |
| 6,661,918 B1 | 12/2003 | Gordon et al. |
| 6,674,877 B1 | 1/2004 | Jojic et al. |
| 6,702,494 B2 | 3/2004 | Dumler et al. |
| 6,734,911 B1 | 5/2004 | Lyons |
| 6,798,628 B1 | 9/2004 | Macbeth |
| 6,804,654 B2 | 10/2004 | Kobylevsky et al. |
| 6,804,656 B1 | 10/2004 | Rosenfeld et al. |
| 6,814,656 B2 | 11/2004 | Rodriguez |
| 6,819,796 B2 | 11/2004 | Hong et al. |
| 6,919,880 B2 | 7/2005 | Morrison et al. |
| 6,950,534 B2 | 9/2005 | Cohen et al. |
| 6,993,157 B1 | 1/2006 | Oue et al. |
| 7,152,024 B2 | 12/2006 | Marschner et al. |
| 7,213,707 B2 | 5/2007 | Hubbs et al. |
| 7,215,828 B2 | 5/2007 | Luo |
| 7,244,233 B2 | 7/2007 | Krantz et al. |
| 7,257,237 B1 | 8/2007 | Luck et al. |
| 7,259,873 B2 | 8/2007 | Sikora et al. |
| 7,308,112 B2 | 12/2007 | Fujimura et al. |
| 7,340,077 B2 | 3/2008 | Gokturk et al. |
| 7,519,223 B2 | 4/2009 | Dehlin et al. |
| 7,532,206 B2 | 5/2009 | Morrison et al. |
| 7,536,032 B2 | 5/2009 | Bell |
| 7,542,586 B2 | 6/2009 | Johnson |
| 7,598,942 B2 | 10/2009 | Underkoffler et al. |
| 7,606,417 B2 | 10/2009 | Steinberg et al. |
| 7,646,372 B2 | 1/2010 | Marks et al. |
| 7,656,372 B2 | 2/2010 | Sato et al. |
| 7,665,041 B2 | 2/2010 | Wilson et al. |
| 7,692,625 B2 | 4/2010 | Morrison et al. |
| 7,831,932 B2 | 11/2010 | Josephsoon et al. |
| 7,840,031 B2 | 11/2010 | Albertson et al. |
| 7,861,188 B2 | 12/2010 | Josephsoon et al. |
| 7,940,885 B2 | 5/2011 | Stanton et al. |
| 7,948,493 B2 | 5/2011 | Klefenz et al. |
| 7,961,174 B1 | 6/2011 | Markovic et al. |
| 7,961,934 B2 | 6/2011 | Thrun et al. |
| 7,971,156 B2 | 6/2011 | Albertson et al. |
| 7,980,885 B2 | 7/2011 | Gattwinkel et al. |
| 8,064,704 B2 | 11/2011 | Kim et al. |
| 8,085,339 B2 | 12/2011 | Marks |
| 8,086,971 B2 | 12/2011 | Radivojevic et al. |
| 8,111,239 B2 | 2/2012 | Pryor et al. |
| 8,112,719 B2 | 2/2012 | Hsu et al. |
| 8,144,233 B2 | 3/2012 | Fukuyama |
| 8,185,176 B2 | 5/2012 | Mangat et al. |
| 8,213,707 B2 | 7/2012 | Li et al. |
| 8,218,858 B2 | 7/2012 | Gu |
| 8,229,134 B2 | 7/2012 | Duraiswami et al. |
| 8,244,233 B2 | 8/2012 | Chang et al. |
| 8,249,345 B2 | 8/2012 | Wu et al. |
| 8,289,162 B2 | 10/2012 | Mooring et al. |
| 8,290,208 B2 | 10/2012 | Kurtz et al. |
| 8,304,727 B2 | 11/2012 | Lee et al. |
| 8,514,221 B2 | 8/2013 | King et al. |
| 8,631,355 B2 | 1/2014 | Murillo et al. |
| 8,638,989 B2 | 1/2014 | Holz |
| 8,659,594 B2 | 2/2014 | Kim et al. |
| 8,659,658 B2 | 2/2014 | Vassigh et al. |
| 8,693,731 B2 | 4/2014 | Holz et al. |
| 8,738,523 B1 | 5/2014 | Sanchez et al. |
| 8,744,122 B2 | 6/2014 | Salgian et al. |
| 8,817,087 B2 | 8/2014 | Weng et al. |
| 8,842,084 B2 | 9/2014 | Andersson et al. |
| 8,843,857 B2 | 9/2014 | Berkes et al. |
| 8,872,914 B2 | 10/2014 | Gobush |
| 8,929,609 B2 | 1/2015 | Padovani et al. |
| 8,930,852 B2 | 1/2015 | Chen et al. |
| 8,942,881 B2 | 1/2015 | Hobbs et al. |
| 8,954,340 B2 | 2/2015 | Sanchez et al. |
| 8,957,857 B2 | 2/2015 | Lee et al. |
| 9,056,396 B1 | 6/2015 | Linnell |
| 9,063,574 B1* | 6/2015 | Ivanchenko ............ G06F 3/017 |
| 9,070,019 B2 | 6/2015 | Holz |
| 2002/0008211 A1 | 1/2002 | Kask |
| 2002/0080094 A1 | 6/2002 | Biocca et al. |
| 2002/0105484 A1 | 8/2002 | Navab et al. |
| 2003/0053658 A1 | 3/2003 | Pavlidis |
| 2003/0053659 A1 | 3/2003 | Pavlidis et al. |
| 2003/0123703 A1 | 7/2003 | Pavlidis et al. |
| 2003/0152289 A1 | 8/2003 | Luo |
| 2003/0202697 A1 | 10/2003 | Simard et al. |
| 2004/0125228 A1 | 7/2004 | Dougherty |
| 2004/0145809 A1 | 7/2004 | Brenner |
| 2004/0212725 A1 | 10/2004 | Raskar |
| 2005/0007673 A1 | 1/2005 | Chaoulov et al. |
| 2005/0068518 A1 | 3/2005 | Baney et al. |
| 2005/0131607 A1 | 6/2005 | Breed |
| 2005/0156888 A1 | 7/2005 | Xie et al. |
| 2005/0168578 A1 | 8/2005 | Gobush |
| 2005/0236558 A1 | 10/2005 | Nabeshima et al. |
| 2006/0017807 A1 | 1/2006 | Lee et al. |
| 2006/0072105 A1 | 4/2006 | Wagner |
| 2006/0204040 A1 | 9/2006 | Freeman et al. |
| 2006/0210112 A1 | 9/2006 | Cohen et al. |
| 2006/0290950 A1 | 12/2006 | Platt et al. |
| 2007/0042346 A1 | 2/2007 | Weller |
| 2007/0086621 A1 | 4/2007 | Aggarwal et al. |
| 2007/0130547 A1 | 6/2007 | Boillot |
| 2007/0206719 A1 | 9/2007 | Suryanarayanan et al. |
| 2007/0238956 A1 | 10/2007 | Haras et al. |
| 2008/0013826 A1 | 1/2008 | Hillis et al. |
| 2008/0019576 A1 | 1/2008 | Senftner et al. |
| 2008/0031492 A1 | 2/2008 | Lanz |
| 2008/0056752 A1 | 3/2008 | Denton et al. |
| 2008/0064954 A1 | 3/2008 | Adams et al. |
| 2008/0106637 A1 | 5/2008 | Nakao et al. |
| 2008/0106746 A1 | 5/2008 | Shpunt et al. |
| 2008/0110994 A1 | 5/2008 | Knowles et al. |
| 2008/0118091 A1 | 5/2008 | Serfaty et al. |
| 2008/0187175 A1 | 8/2008 | Kim et al. |
| 2008/0244468 A1 | 10/2008 | Nishihara et al. |
| 2008/0273764 A1 | 11/2008 | Scholl |
| 2008/0278589 A1 | 11/2008 | Thorn |
| 2008/0304740 A1 | 12/2008 | Sun et al. |
| 2008/0319356 A1 | 12/2008 | Cain et al. |
| 2009/0002489 A1 | 1/2009 | Yang et al. |
| 2009/0093307 A1 | 4/2009 | Miyaki |
| 2009/0102840 A1 | 4/2009 | Li |
| 2009/0103780 A1 | 4/2009 | Nishihara et al. |
| 2009/0116742 A1 | 5/2009 | Nishihara |
| 2009/0122146 A1 | 5/2009 | Zalewski et al. |
| 2009/0203993 A1 | 8/2009 | Mangat et al. |
| 2009/0203994 A1 | 8/2009 | Mangat et al. |

(56) References Cited

U.S. PATENT DOCUMENTS

| | | |
|---|---|---|
| 2009/0217211 A1 | 8/2009 | Hildreth et al. |
| 2009/0257623 A1 | 10/2009 | Tang et al. |
| 2009/0274339 A9 | 11/2009 | Cohen et al. |
| 2009/0309710 A1 | 12/2009 | Kakinami |
| 2010/0013832 A1 | 1/2010 | Xiao et al. |
| 2010/0020078 A1 | 1/2010 | Shpunt |
| 2010/0023015 A1 | 1/2010 | Park |
| 2010/0026963 A1 | 2/2010 | Faulstich |
| 2010/0027845 A1 | 2/2010 | Kim et al. |
| 2010/0046842 A1 | 2/2010 | Conwell |
| 2010/0053164 A1 | 3/2010 | Imai et al. |
| 2010/0058252 A1 | 3/2010 | Ko |
| 2010/0066737 A1 | 3/2010 | Liu |
| 2010/0066975 A1 | 3/2010 | Rehnstrom |
| 2010/0118123 A1 | 5/2010 | Freedman et al. |
| 2010/0125815 A1 | 5/2010 | Wang et al. |
| 2010/0141762 A1 | 6/2010 | Siann et al. |
| 2010/0158372 A1 | 6/2010 | Kim et al. |
| 2010/0177929 A1 | 7/2010 | Kurtz et al. |
| 2010/0201880 A1 | 8/2010 | Iwamura |
| 2010/0219934 A1 | 9/2010 | Matsumoto |
| 2010/0222102 A1 | 9/2010 | Rodriguez |
| 2010/0264833 A1 | 10/2010 | Van Endert et al. |
| 2010/0277411 A1 | 11/2010 | Yee et al. |
| 2010/0296698 A1 | 11/2010 | Lien et al. |
| 2010/0302357 A1 | 12/2010 | Hsu et al. |
| 2010/0303298 A1 | 12/2010 | Marks et al. |
| 2010/0306712 A1 | 12/2010 | Snook et al. |
| 2010/0309097 A1 | 12/2010 | Raviv et al. |
| 2011/0007072 A1 | 1/2011 | Khan et al. |
| 2011/0026765 A1 | 2/2011 | Ivanich et al. |
| 2011/0043806 A1 | 2/2011 | Guetta et al. |
| 2011/0057875 A1 | 3/2011 | Shigeta et al. |
| 2011/0080470 A1 | 4/2011 | Kuno et al. |
| 2011/0080490 A1 | 4/2011 | Clarkson et al. |
| 2011/0093820 A1 | 4/2011 | Zhang et al. |
| 2011/0096033 A1 | 4/2011 | Ko |
| 2011/0103643 A1* | 5/2011 | Salsman .......... G06K 9/00261 382/103 |
| 2011/0107216 A1 | 5/2011 | Bi |
| 2011/0115486 A1 | 5/2011 | Frohlich et al. |
| 2011/0116684 A1 | 5/2011 | Coffman et al. |
| 2011/0119640 A1 | 5/2011 | Berkes et al. |
| 2011/0134112 A1 | 6/2011 | Koh et al. |
| 2011/0148875 A1 | 6/2011 | Kim et al. |
| 2011/0169726 A1 | 7/2011 | Holmdahl et al. |
| 2011/0173574 A1 | 7/2011 | Clavin et al. |
| 2011/0181509 A1 | 7/2011 | Rautiainen et al. |
| 2011/0193778 A1 | 8/2011 | Lee et al. |
| 2011/0205151 A1 | 8/2011 | Newton et al. |
| 2011/0213664 A1 | 9/2011 | Osterhout et al. |
| 2011/0228978 A1 | 9/2011 | Chen et al. |
| 2011/0234840 A1 | 9/2011 | Klefenz et al. |
| 2011/0261178 A1 | 10/2011 | Lo et al. |
| 2011/0267259 A1 | 11/2011 | Tidemand et al. |
| 2011/0279397 A1 | 11/2011 | Rimon et al. |
| 2011/0286676 A1 | 11/2011 | El Dokor |
| 2011/0289455 A1 | 11/2011 | Reville et al. |
| 2011/0289456 A1 | 11/2011 | Reville et al. |
| 2011/0291925 A1 | 12/2011 | Israel et al. |
| 2011/0291988 A1 | 12/2011 | Bamji et al. |
| 2011/0296353 A1 | 12/2011 | Ahmed et al. |
| 2011/0299737 A1 | 12/2011 | Wang et al. |
| 2011/0304650 A1 | 12/2011 | Campillo et al. |
| 2011/0310007 A1 | 12/2011 | Margolis et al. |
| 2011/0310220 A1 | 12/2011 | McEldowney |
| 2011/0314427 A1 | 12/2011 | Sundararajan |
| 2012/0038637 A1 | 2/2012 | Marks |
| 2012/0050157 A1 | 3/2012 | Latta et al. |
| 2012/0065499 A1 | 3/2012 | Chono |
| 2012/0068914 A1 | 3/2012 | Jacobsen et al. |
| 2012/0163675 A1 | 6/2012 | Joo et al. |
| 2012/0194517 A1 | 8/2012 | Izadi et al. |
| 2012/0204133 A1 | 8/2012 | Guendelman et al. |
| 2012/0206339 A1* | 8/2012 | Dahl .................. G06F 3/043 345/156 |
| 2012/0223959 A1 | 9/2012 | Lengeling |
| 2012/0236288 A1 | 9/2012 | Stanley |
| 2012/0250936 A1 | 10/2012 | Holmgren |
| 2012/0270654 A1 | 10/2012 | Padovani et al. |
| 2012/0274781 A1 | 11/2012 | Shet et al. |
| 2013/0004016 A1* | 1/2013 | Karakotsios ........ G06K 9/00355 382/103 |
| 2013/0019204 A1 | 1/2013 | Kotler et al. |
| 2013/0148852 A1 | 6/2013 | Partis et al. |
| 2013/0239059 A1 | 9/2013 | Chen et al. |
| 2013/0241832 A1 | 9/2013 | Rimon et al. |
| 2013/0257736 A1 | 10/2013 | Hou et al. |
| 2014/0081521 A1 | 3/2014 | Frojdh et al. |
| 2014/0085203 A1 | 3/2014 | Kobayashi |
| 2014/0125813 A1 | 5/2014 | Holz |
| 2014/0139641 A1 | 5/2014 | Holz |
| 2014/0161311 A1 | 6/2014 | Kim |
| 2014/0168062 A1 | 6/2014 | Katz et al. |
| 2014/0177913 A1 | 6/2014 | Holz |
| 2014/0189579 A1 | 7/2014 | Rimon et al. |
| 2014/0222385 A1 | 8/2014 | Muenster et al. |
| 2014/0253512 A1 | 9/2014 | Narikawa et al. |
| 2014/0307920 A1 | 10/2014 | Holz |
| 2014/0364212 A1 | 12/2014 | Osman et al. |
| 2014/0375547 A1 | 12/2014 | Katz et al. |
| 2015/0003673 A1 | 1/2015 | Fletcher |
| 2015/0016777 A1 | 1/2015 | Abovitz et al. |
| 2015/0022447 A1 | 1/2015 | Hare et al. |
| 2015/0029091 A1 | 1/2015 | Nakashima et al. |
| 2015/0115802 A1 | 4/2015 | Kuti et al. |
| 2015/0116214 A1 | 4/2015 | Grunnet-Jepsen et al. |
| 2015/0131859 A1 | 5/2015 | Kim et al. |

FOREIGN PATENT DOCUMENTS

| | | |
|---|---|---|
| CN | 101729808 A | 6/2010 |
| CN | 101930610 A | 12/2010 |
| CN | 101951474 A | 1/2011 |
| CN | 102053702 A | 5/2011 |
| CN | 201859393 U | 6/2011 |
| CN | 102201121 A | 9/2011 |
| CN | 102236412 A | 11/2011 |
| DE | 4201934 A1 | 7/1993 |
| DE | 102007015495 A1 | 10/2007 |
| DE | 102007015497 B4 | 1/2014 |
| EP | 0999542 A1 | 5/2000 |
| EP | 1477924 A2 | 11/2004 |
| EP | 1837665 A2 | 9/2007 |
| EP | 2369443 A2 | 9/2011 |
| GB | 2419433 A | 4/2006 |
| GB | 2480140 A | 11/2011 |
| GB | 2519418 A | 4/2015 |
| JP | H08261721 A | 10/1996 |
| JP | H09259278 A | 10/1997 |
| JP | 2000023038 A | 1/2000 |
| JP | 2002-133400 A | 5/2002 |
| JP | 2003256814 A | 9/2003 |
| JP | 2004246252 A | 9/2004 |
| JP | 2006019526 A | 1/2006 |
| JP | 2006259829 A | 9/2006 |
| JP | 2007272596 A | 10/2007 |
| JP | 2008227569 A | 9/2008 |
| JP | 2009031939 A | 2/2009 |
| JP | 2009037594 A | 2/2009 |
| JP | 2011010258 A | 1/2011 |
| JP | 2011065652 A | 3/2011 |
| JP | 4906960 B2 | 3/2012 |
| KR | 101092909 B1 | 6/2011 |
| RU | 2422878 C1 | 6/2011 |
| TW | 200844871 A | 11/2008 |
| WO | 1994026057 A1 | 11/1994 |
| WO | 2004114220 A1 | 12/2004 |
| WO | 2006020846 A2 | 2/2006 |
| WO | 2007137093 A2 | 11/2007 |
| WO | 201007662 A1 | 1/2010 |
| WO | 2010032268 A2 | 3/2010 |
| WO | 2010076622 A1 | 7/2010 |

(56) References Cited

FOREIGN PATENT DOCUMENTS

| WO | 2010088035 A2 | 8/2010 |
|---|---|---|
| WO | 20100138741 A1 | 12/2010 |
| WO | 2011024193 A2 | 3/2011 |
| WO | 2011036618 A2 | 3/2011 |
| WO | 2011044680 A1 | 4/2011 |
| WO | 2011045789 A1 | 4/2011 |
| WO | 2011119154 A1 | 9/2011 |
| WO | 2012027422 A2 | 3/2012 |
| WO | 2013109608 A2 | 7/2013 |
| WO | 2013109609 A2 | 7/2013 |
| WO | 2014208087 A1 | 12/2014 |
| WO | 2015026707 A1 | 2/2015 |

OTHER PUBLICATIONS

Di Zenzo, S., et al., "Advances in Image Segmentation," Image and Vision Computing, Elsevier, Guildford, GBN, vol. 1, No. 1, Copyright Butterworth & Co Ltd., Nov. 1, 1983, pp. 196-210.

Davis, et al., "Toward 3-D Gesture Recognition," International Journal of Pattern Recognition and Artificial Intelligence, MIT Media Lab, Copyright 1999, pp. 1-16.

Butail, S., et al., "Three-Dimensional Reconstruction of the Fast-Start Swimming Kinematics of Densely Schooling Fish," Journal of the Royal Society Interface, Jun. 3, 2011, retrieved from the Internet <http://www.ncbi.nlm.nih.gov/pubmed/21642367>, pp. 0, 1-12.

Kim, et al., "Development of an Orthogonal Double-Image Processing Algorithm to Measure Bubble," Department of Nuclear Engineering and Technology, Seoul National University Korea, vol. 39 No. 4, Published Jul. 6, 2007, pp. 313-326.

Barat, et al., "Feature Correspondences from Multiple Views of Coplanar Ellipses" Author manuscript, published in 2nd International Symposium on Visual Computing, Lake Tahoe, Nevada, United States (2006), 10 pages.

Cheikh, et al., "Multipeople Tracking Across Multiple Cameras," International Journal on New Computer Architectures and Their Applications (IJNCAA) 2(1): 23-33 The Society of Digital Information and Wireless Communications, Copyright 2012. pp. 23-33.

Rasmussen, "An Analytical Framework for the Preparation and Animation of a Virtual Mannequin for the Purpose of Mannequin-Clothing Interaction Modeling," Thesis for Master of Science in Civil and Environmental ENgineering, Graduate College of The University of Iowa, Copyright Dec. 2008, 98 pages.

Kulesza, et al., "Arrangement of a Multi Stereo Visual Sensor System for a Human Activities Space," Source: Stereo Vision, Book edited by: Dr. Asim Bhatti, ISBN 978-953-7619-22-0, Copyright Nov. 2008, I-Tech, Vienna, Austria, www.intechopen.com, pp. 153-173.

Heikkila, "Accurate Camera Calibration and Feature Based 3-D Reconstruction From Monocular Image Sequences," Infotech Oulu and Department of Electrical Engineering, University of Oulu, Finland, Oulu, Oct. 10, 1997, pp. 1-126.

Dombeck, D., et al., "Optical Recording of Action Potentials with Second-Harmonic Generation Microscopy," The Journal of Neuroscience, Jan. 28, 2004, vol. 24(4): pp. 999-1003.

Olsson, K., et al., "Shape from Silhouette Scanner—Creating a Digital 3D Model of a Real Object by Analyzing Photos From Multiple Views," University of Linkoping, Sweden, Copyright VCG 2001, Retrieved from the Internet: <http://liu.diva-portal.org/smash/get/diva2:18671/FULLTEXT01> on Jun. 17, 2013, 52 pages.

Forbes, K., et al., "Using Silhouette Consistency Constraints to Build 3D Models," University of Cape Town, Copyright De Beers 2003, Retrieved from the internet: <http://www.dip.ee.uct.ac.za/~kforbes/Publications/Forbes2003Prasa.pdf> on Jun. 17, 2013, 6 pages.

Cumani, A., et al., " Pattern Recognition: Recovering the 3D Structure of Tubular Objects From Stereo Silhouettes," Pattern Recognition, Elsevier, GB, vol. 30, No. 7, Jul. 1, 1997, Retrieved from the Internet: <http://www.sciencedirect.com/science/article/pii/S0031320396001446>, pp. 1051-1059.

May, S., et al., "Robust 3D-Mapping with Time-of-Flight Cameras," 2009 IEEE/RSJ International Conference on Intelligent Robots and Systems, Piscataway, NJ, USA, Oct. 10, 2009, pp. 1673-1678.

Kanhangad, V., et al., "A Unified Framework for Contactless Hand Verification," IEEE Transactions on Information Forensics and Security, IEEE, Piscataway, NJ, US., vol. 6, No. 3, Sep. 1, 2011, pp. 1014-1027.

Arthington, et al., "Cross-section Reconstruction During Uniaxial Loading," Measurement Science and Technology, vol. 20, No. 7, Jun. 10, 2009, Retrieved from the Internet: http:iopscience.iop.org/0957-0233/20/7/075701, pp. 1-9.

Pedersini, et al., Accurate Surface Reconstruction from Apparent Contours, Sep. 5-8, 2000 European Signal Processing Conference EUSIPCO 2000, vol. 4, Retrieved from the Internet: http://home.deib.polimi.it/sarti/CV_and_publications.html, pp. 1-4.

Chung, et al., "International Journal of Computer Vision: RecoveringLSHGCs and SHGCs from Stereo" [on-line], Oct. 1996 [retrieved on Apr. 10, 2014], Kluwer Academic Publishers, vol. 20, issue 1-2, Retrieved from the Internet: http://link.springer.com/article/10.1007/BF00144116#, pp. 43-58.

Bardinet, et al., "Fitting of iso-Surfaces Using Superquadrics and Free-Form Deformations" [on-line], Jun. 24-25, 1994 [retrieved Jan. 9, 2014], 1994 Proceedings of IEEE Workshop on Biomedical Image Analysis, Retrieved from the Internet: http://ieeexplore.ieee.org/xpls/abs_all.jsp?arnumber=315882&tag=1, pp. 184-193.

U.S. Appl. No. 13/742,845—Non-Final Office Action dated Jul. 22, 2013, 19 pages.

U.S. Appl. No. 13/742,845—Notice of Allowance dated Dec. 5, 2013, 23 pages.

U.S. Appl. No. 13/742,953—Non-Final Office Action dated Jun. 14, 2013, 13 pages (non HBW).

U.S. Appl. No. 13/742,953—Notice of Allowance dated Nov. 4, 2013, 14 pages (non HBW).

PCT/US2013/021709—International Preliminary Report on Patentability, dated Jul. 22, 2014, 22 pages.

PCT/US2013/021713—International Preliminary Report on Patentability, dated Jul. 22, 2014, 13 pages.

U.S. Appl. No. 13/414,485—Non Final Office Action dated May 19, 2014, 16 pages.

U.S. Appl. No. 13/414,485—Final Office Action dated Feb. 2, 2015, 30 pages.

PCT/US2013/021709—International Search Report dated Sep. 12, 2013, 7 pages.

Texas Instruments, "QVGA 3D Time-of-Flight Sensor," Product Overview: OPT 8140, Dec. 2013, Texas Instruments Incorporated, 10 pages.

Texas Instruments, "4-Channel, 12-Bit, 80-MSPS ADC," VSP5324, Revised Nov. 2012, Texas Instruments Incorporated, 55 pages.

Texas Instruments, "Time-of-Flight Controller (TFC)," Product Overview; OPT9220, Jan. 2014, Texas Instruments Incorporated, 43 pages.

PCT/US2013/069231—International Preliminary Report with Written Opinion dated May 12, 2015, 8 pages.

U.S. Appl. No. 14/106,148—Non Final Office Action dated Jul. 6, 2015, 14 pages.

U.S. Appl. No. 14/250,758—Non Final Office Action dated Jul. 6, 2015, 8 pages.

U.S. Appl. No. 13/414,485—Non Final Office Action dated Jul. 30, 2015, 22 pages.

Ehliar, A., et al, "Benchmarking Network Processors," Department of Electrical Engineering, Linkoping University, Sweden, Copyright 2004, 4 pages.

U.S. Appl. No. 13/744,810—Notice of Allowance dated Nov. 6, 2015, 8 pages.

U.S. Appl. No. 13/744,810—Notice of Allowance dated Sep. 25, 2015, 11 pages.

\* cited by examiner

POWER CONSUMPTION IN MOTION-CAPTURE SYSTEMS

FIELD OF THE TECHNOLOGY DISCLOSED

PRIORITY DATA

This application claims the benefit of U.S. Provisional Patent Application No. 61/749,638, filed Jan. 7, 2013, entitled "OPTIMIZING POWER CONSUMPTION IN MOTION-CAPTURE SYSTEMS", (Atty Docket No. ULTI 1028-2). The provisional application is hereby incorporated by reference for all purposes.

The technology disclosed relates, in general, to image acquisition and analysis, and in particular implementations to capturing motions of objects in three-dimensional space.

BACKGROUND

Power requirements, however, can pose a practical limit to the range of applications of motion-capture systems, as excessive power consumption can render their employment impractical or economically infeasible. It would therefore be desirable to reduce power consumption of motion-capture systems, preferably in a manner that does not affect motion-tracking performance.

SUMMARY

The technology disclosed provides systems and methods for reducing the overall power consumption of motion-capture system without compromising the quality of motion capture and tracking. In one implementation, this is accomplished by operating the motion-detecting cameras and associated image-processing hardware in a low-power mode (e.g., at a low frame rate or in a standby or sleep mode) unless and until a moving object is detected. Once an object of interest has been detected in the field of view of the cameras, the motion-capture system is "woken up," i.e., switched into a high-power mode, in which it acquires and processes images at a frame rate sufficient for accurate motion tracking. For example, in a computer system that interprets a user's hand gestures as input, the requisite motion-capture system associated with the computer terminal may be idle, i.e., run in a low-power mode, as long as everything in the camera's field of view is static, and start capturing images at a high rate only when a person has entered the field of view. This way, high power consumption is limited to time periods when it results in a corresponding benefit, i.e., when the system is actively used for motion capture.

The motion detection that triggers a "wake-up" of the motion-capture system can be accomplished in several ways. In some implementations, images captured by the camera(s) at a very low frame rate are analyzed for the presence or movement of objects of interest. In other implementations, the system includes additional light sensors, e.g., located near the camera(s), that monitor the environment for a change in brightness indicative of the presence of an object. For example, in a well-lit room, a person walking into the field of view near the camera(s) may cause a sudden, detectable decrease in brightness. In a modified implementation applicable to motion-capture systems that illuminate the object of interest for contrast-enhancement, the light source(s) used for that purpose in motion-tracking mode are blinked, and reflections from the environment captured; in this case, a change in reflectivity may be used as an indicator that an object of interest has entered the field of view.

In some implementations, the motion-capture system is capable of operation in intermediate modes with different rates of image capture. For example, the system can "throttle" the rate of image capture based on the speed of the detected motion, or the rate may be reset in real time by the user, in order to maximally conserve power.

Other aspects and advantages of the present technology can be seen on review of the drawings, the detailed description and the claims, which follow.

BRIEF DESCRIPTION OF THE DRAWINGS

In the drawings, like reference characters generally refer to the same parts throughout the different views. Also, the drawings are not necessarily to scale, with an emphasis instead generally being placed upon illustrating the principles of the invention. In the following description, various embodiments of the present invention are described with reference to the following drawings, in which.

DESCRIPTION

The term "motion capture" refers generally to processes that capture movement of a subject in three-dimensional (3D) space and translate that movement into, for example, a digital model or other representation. Motion capture is typically used with complex subjects that have multiple separately articulating members whose spatial relationships change as the subject moves. For instance, if the subject is a walking person, not only does the whole body move across space, but the positions of arms and legs relative to the person's core or trunk are constantly shifting. Motion-capture systems are typically designed to model this articulation.

Motion-capture systems may utilize one or more cameras to capture sequential images of an object in motion, and computers to analyze the images to create a reconstruction of an object's shape, position, and orientation as a function of time. For 3D motion capture, at least two cameras are typically used. Image-based motion-capture systems rely on the ability to distinguish an object of interest from a background. This is often achieved using image-analysis algorithms that detect edges, typically by comparing pixels to detect abrupt changes in color and/or brightness. Conventional systems, however, suffer performance degradation under many common circumstances, e.g., low contrast between the object of interest and the background and/or patterns in the background that may falsely register as object edges.

Object recognition can be improved by enhancing contrast between the object and background surfaces visible in an image, for example, by means of controlled lighting directed at the object. For instance, in a motion-capture system where an object of interest, such as a person's hand, is significantly closer to the camera than any background surfaces, the falloff of light intensity with distance ($1/r^2$ for point like light sources) can be exploited by positioning a light source (or multiple light sources) near the camera(s) or other image-capture device(s) and shining that light onto the object. Source light reflected by the nearby object of interest can be expected to be much brighter than light reflected from more distant background surfaces, and the more distant the background (relative to the object), the more pronounced the effect will be. Accordingly, a threshold cut off on pixel brightness in the captured images can be used to distinguish "object" pixels from "background" pixels. While broadband ambient light sources can be employed, various implementations use light having a confined wavelength range and a camera matched to detect such light; for example, an infrared source light can be used with one or more cameras sensitive to infrared frequencies.

Figure 1:
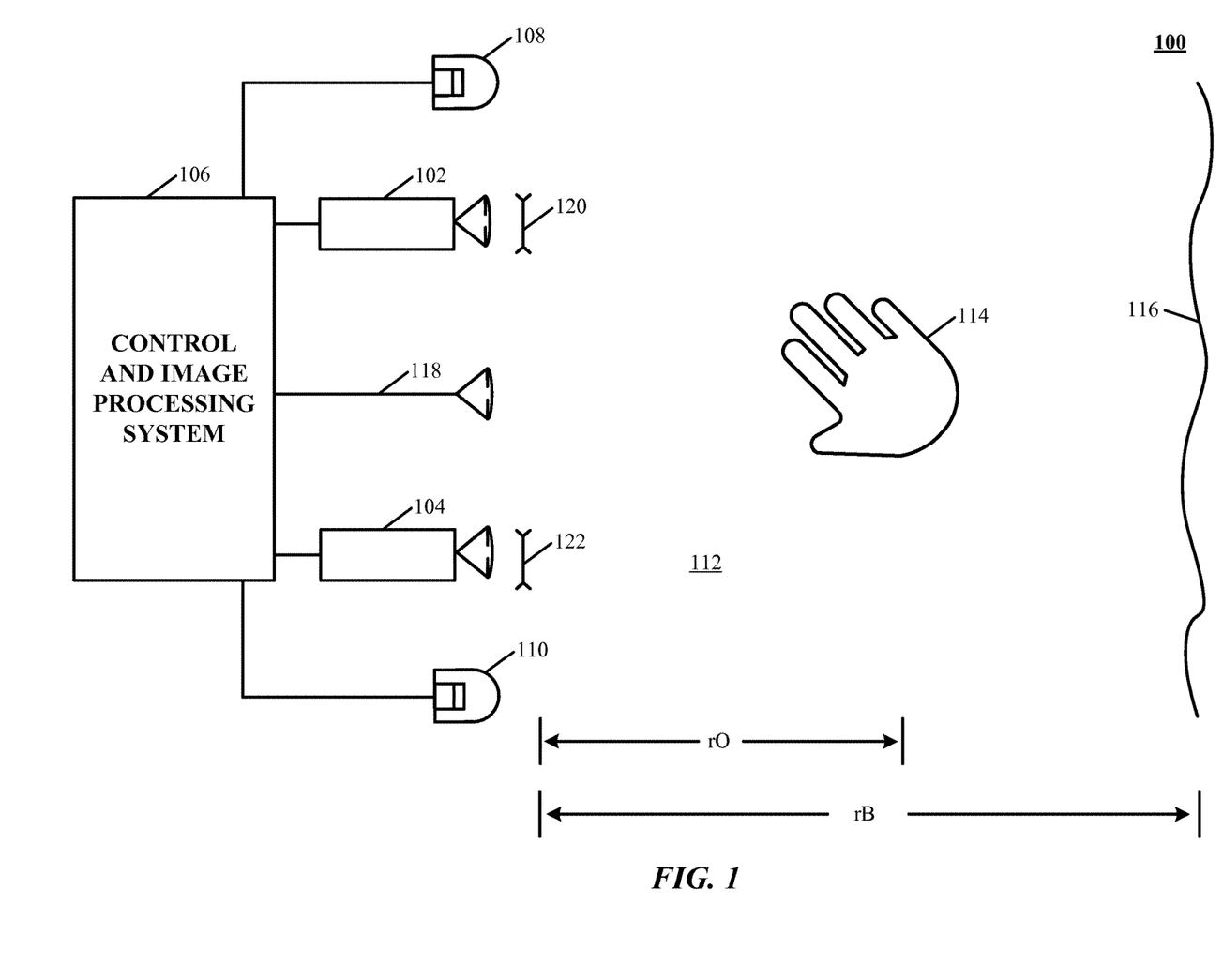
FIG. 1 illustrates a system for capturing image data according to an implementation of the technology disclosed.

In order to accurately track motion in real or near-real time, the camera(s) of motion-capture systems typically operate at a frame rate of at least 15 image frames per second. Image acquisition at such high rates entails significant power requirements; in general, there is a trade-off between the frame-rate-dependent accuracy and responsiveness of motion-capture systems on the one hand and power consumption on the other hand. FIG. 1 illustrates a system 100 for capturing image data according to an implementation of the technology disclosed. The system 100 includes a pair of cameras 102, 104 coupled to a control and image-processing system 106. (The system 106 is hereinafter variably referred to as the "control and image-processing system," the "control system," or the "image-processing system," depending on which functionality of the system is being discussed.) The cameras 102, 104 can be any type of camera (e.g., CCD or CMOS cameras), including cameras sensitive across the visible spectrum or, more typically, with enhanced sensitivity to a confined wavelength band (e.g., the infrared (IR) or ultraviolet bands); more generally, the term "camera" herein refers to any device (or combination of devices) capable of capturing an image of an object and representing that image in the form of digital data. For example, line sensors or line cameras rather than conventional devices that capture a two-dimensional (2D) image can be employed. The term "light" is used generally to connote any electromagnetic radiation, which may or may not be within the visible spectrum, and may be broadband (e.g., white light) or narrowband (e.g., a single wavelength or narrow band of wavelengths). The cameras 102, 104 are preferably capable of capturing video images, i.e., successive image frames at a constant rate of, typically, at least 15 frames per second (although no particular frame rate is required). The capabilities of the cameras 102, 104 are not critical to the technology disclosed, and the cameras can vary as to frame rate, image resolution (e.g., pixels per image), color or intensity resolution (e.g., number of bits of intensity data per pixel), focal length of lenses, depth of field, etc. In general, for a particular application, any cameras capable of focusing on objects within a spatial volume of interest can be used. For instance, to capture motion of the hand of an otherwise stationary person, the volume of interest might be defined as a cube approximately one meter in length.

System 100 also includes a pair of light sources 108, 110, which can be disposed, e.g., to either side of cameras 102, 104, and controlled by control and image-processing system 106. Light sources 108, 110 can be infrared light sources of generally conventional design, e.g., infrared light-emitting diodes (LEDs), and cameras 102, 104 can be sensitive to infrared light. Filters 120, 122 can be placed in front of cameras 102, 104 to filter out visible light so that only infrared light is registered in the images captured by cameras 102, 104. In some implementations where the object of interest is a person's hand or body, use of infrared light can allow the motion-capture system to operate under a broad range of lighting conditions and can avoid various inconveniences or distractions that may be associated with directing visible light into the region where the person is moving. However, a particular wavelength or region of the electromagnetic spectrum is generally not required. Instead of LEDs, lasers or other light sources can be used. For laser setups, additional optics (e.g., a lens or diffuser) may be employed to widen the laser beam (and make its field of view similar to that of the cameras). Useful arrangements can also include short- and wide-angle illuminators for different ranges. Light sources are typically diffuse rather than specular point sources; for example, packaged LEDs with light-spreading encapsulation are suitable.

In operation, cameras 102, 104 are oriented toward a region of interest 112 in which an object of interest 114 (in this example, a hand) and one or more background objects 116 can be present. Light sources 108, 110 are arranged to illuminate region 112. In some implementations, one or more of the light sources 108, 110 and one or more of the cameras 102, 104 are disposed below the motion to be detected, e.g., in the case of hand motion, on a table or other surface beneath the spatial region where hand motion occurs. This is an optimal location because the amount of information recorded about the hand is proportional to the number of pixels it occupies in the camera images, and the hand will occupy more pixels when the camera's angle with respect to the hand's "pointing direction" is as close to perpendicular as possible. Further, if the cameras 102, 104 are looking up, there is little likelihood of confusion with background objects (clutter on the user's desk, for example) and other people within the cameras' field of view.

Control and image-processing system 106, which can be, e.g., a computer system, can control the operation of light sources 108, 110 and cameras 102, 104 to capture images of region 112. Based on the captured images, the image-processing system 106 determines the position and/or motion of object 114. For example, as a step in determining the position of object 114, image-analysis system 106 can determine which pixels of various images captured by cameras 102, 104 contain portions of object 114. In some implementations, any pixel in an image can be classified as an "object" pixel or a "background" pixel depending on whether that pixel contains a portion of object 114 or not. With the use of light sources 108, 110, classification of pixels as object or background pixels can be based on the brightness of the pixel. For example, the distance (rO) between an object of interest 114 and cameras 102, 104 is expected to be smaller than the distance (rB) between background object(s) 116 and cameras 102, 104. Because the intensity of light from sources 108, 110 decreases as $1/r^2$, object 114 will be more brightly lit than background 116, and pixels containing portions of object 114 (i.e., object pixels) will be correspondingly brighter than pixels containing portions of background 116 (i.e., background pixels). For example, if rB/rO=2, then object pixels will be approximately four times brighter than background pixels, assuming object 114 and background 116 are similarly reflective of the light from sources 108, 110, and further assuming that the overall illumination of region 112 (at least within the frequency band captured by cameras 102, 104) is dominated by light sources 108, 110. These assumptions generally hold for suitable choices of cameras 102, 104, light sources 108, 110, filters 120, 122, and objects commonly encountered. For example, light sources 108, 110 can be infrared LEDs capable of strongly emitting radiation in a narrow frequency band, and filters 120, 122 can be matched to the frequency band of light sources 108, 110. Thus, although a human hand or body, or a heat source or other object in the background, may emit some infrared radiation, the response of cameras 102, 104 can still be dominated by light originating from sources 108, 110 and reflected by object 114 and/or background 116.

In this arrangement, image-analysis system 106 can quickly and accurately distinguish object pixels from background pixels by applying a brightness threshold to each pixel. For example, pixel brightness in a CMOS sensor or similar device can be measured on a scale from 0.0 (dark) to 1.0 (fully saturated), with some number of gradations in between depending on the sensor design. The brightness encoded by the camera pixels scales standardly (linearly) with the luminance of the object, typically due to the deposited charge or diode voltages. In some implementations, light sources 108, 110 are bright enough that reflected light from an object at distance rO produces a brightness level of 1.0 while an object at distance rB=2rO produces a brightness level of 0.25. Object pixels can thus be readily distinguished from background pixels based on brightness. Further, edges of the object can also be readily detected based on differences in brightness between adjacent pixels, allowing the position of the object within each image to be determined. Correlating object positions between images from cameras 102, 104 allows image-analysis system 106 to determine the location in 3D space of object 114, and analyzing sequences of images allows image-analysis system 106 to reconstruct 3D motion of object 114 using conventional motion algorithms.

It will be appreciated that system 100 is illustrative and that variations and modifications are possible. For example, light sources 108, 110 are shown as being disposed to either side of cameras 102, 104. This can facilitate illuminating the edges of object 114 as seen from the perspectives of both cameras; however, a particular arrangement of cameras and lights is not required. As long as the object is significantly closer to the cameras than the background, enhanced contrast as described herein can be achieved.

In accordance with various implementations of the technology disclosed, the cameras 102, 104 (and typically also the associated image-analysis functionality of control and image-processing system 106) are operated in a low-power mode until an object of interest 114 is detected in the region of interest 112. For purposes of detecting the entrance of an object of interest 114 into this region, the system 100 further includes one or more light sensors 118 that monitor the brightness in the region of interest 112 and detect any change in brightness. For example, a single light sensor including, e.g., a photodiode that provides an output voltage indicative of (and over a large range proportional to) a measured light intensity may be disposed between the two cameras 102, 104 and oriented toward the region of interest. The one or more sensors 118 continuously measure one or more environmental illumination parameters such as the brightness of light received from the environment. Under static conditions—which implies the absence of any motion in the region of interest 112—the brightness will be constant. If an object enters the region of interest 112, however, the brightness may abruptly change. For example, a person walking in front of the sensor(s) 118 may block light coming from an opposing end of the room, resulting in a sudden decrease in brightness. In other situations, the person may reflect light from a light source in the room onto the sensor, resulting in a sudden increase in measured brightness.

The aperture of the sensor(s) 118 may be sized such that its (or their collective) field of view overlaps with that of the cameras 102, 104. In some implementations, the field of view of the sensor(s) 118 is substantially co-existent with that of the cameras 102, 104 such that substantially all objects entering the camera field of view are detected. In other implementations, the sensor field of view encompasses and exceeds that of the cameras. This enables the sensor(s) 118 to provide an early warning if an object of interest approaches the camera field of view. In yet other implementations, the sensor(s) capture(s) light from only a portion of the camera field of view, such as a smaller area of interest located in the center of the camera field of view.

The control and image-processing system 106 monitors the output of the sensor(s) 118, and if the measured brightness changes by a set amount (e.g., by 10% or a certain number of candela), it recognizes the presence of an object of interest in the region of interest 112. The threshold change may be set based on the geometric configuration of the region of interest and the motion-capture system, the general lighting conditions in the area, the sensor noise level, and the expected size, proximity, and reflectivity of the object of interest so as to minimize both false positives and false negatives. In some implementations, suitable settings are determined empirically, e.g., by having a person repeatedly walk into and out of the region of interest 112 and tracking the sensor output to establish a minimum change in brightness associated with the person's entrance into and exit from the region of interest 112. Of course, theoretical and empirical threshold-setting methods may also be used in conjunction. For example, a range of thresholds may be determined based on theoretical considerations (e.g., by physical modeling, which may include ray tracing, noise estimation, etc.), and the threshold thereafter fine-tuned within that range based on experimental observations.

In implementations where the area of interest 112 is illuminated, the sensor(s) 118 will generally, in the absence of an object in this area, only measure scattered light amounting to a small fraction of the illumination light. Once an object enters the illuminated area, however, this object may reflect substantial portions of the light toward the sensor(s) 118, causing an increase in the measured brightness. In some implementations, the sensor(s) 118 is (or are) used in conjunction with the light sources 106, 108 to deliberately measure changes in one or more environmental illumination parameters such as the reflectivity of the environment within the wavelength range of the light sources. The light sources may blink, and a brightness differential be measured between dark and light periods of the blinking cycle. If no object is present in the illuminated region, this yields a baseline reflectivity of the environment. Once an object is in the area of interest 112, the brightness differential will increase substantially, indicating increased reflectivity. (Typically, the signal measured during dark periods of the blinking cycle, if any, will be largely unaffected, whereas the reflection signal measured during the light period will experience a significant boost.) Accordingly, the control system 106 monitoring the output of the sensor(s) 118 may detect an object in the region of interest 112 based on a change in one or more environmental illumination parameters such as environmental reflectivity that exceeds a predetermined threshold (e.g., by 10% or some other relative or absolute amount). As with changes in brightness, the threshold change may be set theoretically based on the configuration of the image-capture system and the monitored space as well as the expected objects of interest, and/or experimentally based on observed changes in reflectivity.

Figure 2:
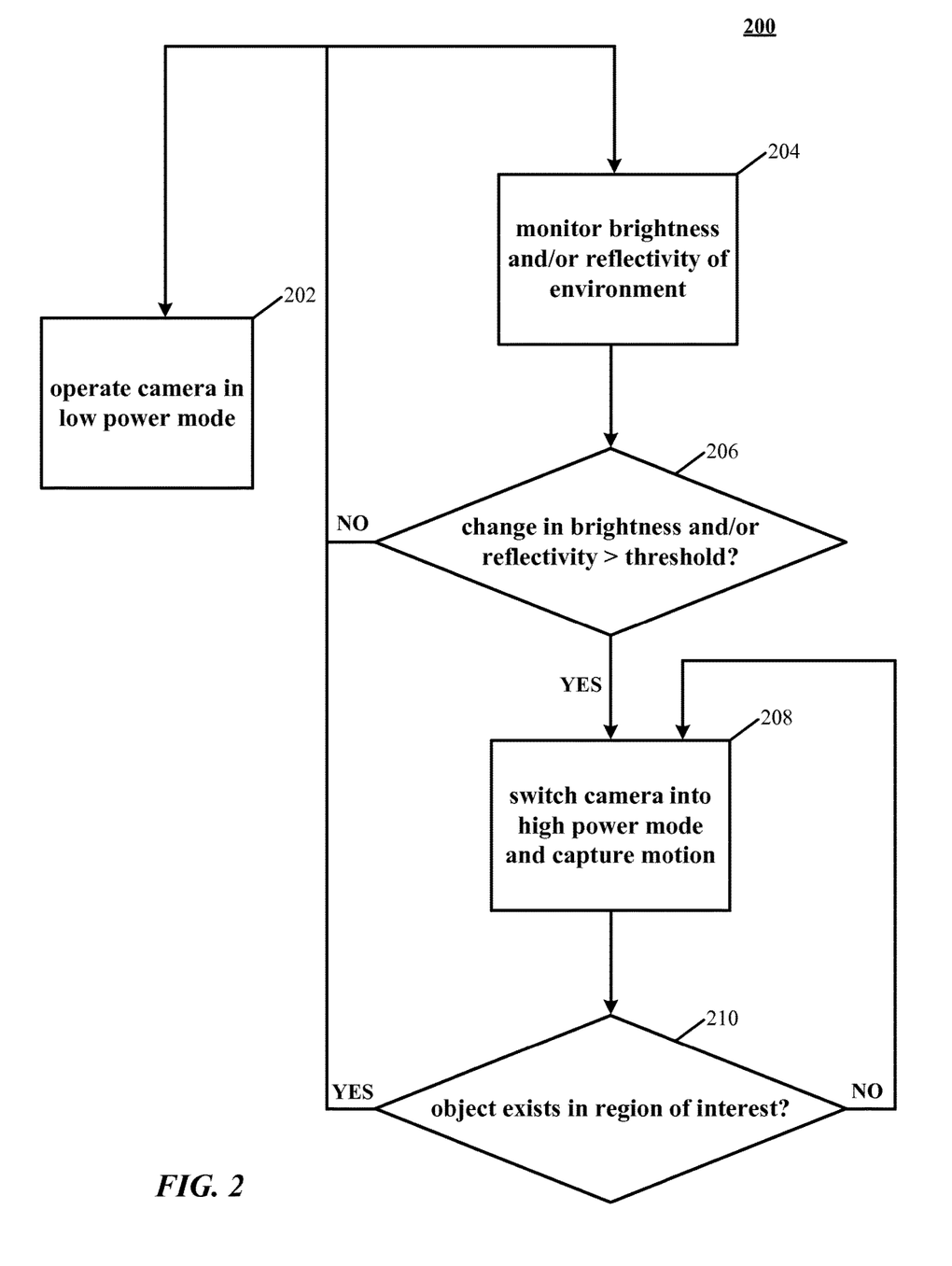
FIG. 2 shows a flowchart of one implementation of operating a motion-capture system with reduced power consumption.

FIG. 2 shows a flowchart 200 of one implementation of operating a motion-capture system with reduced power consumption. In various implementations, changes in brightness or reflectivity as detected based on the sensor measurements described above are used to control the operation of the system 100 so as to minimize power consumption while assuring high-quality motion capture; FIG. 2 illustrates a suitable control method 200. Initially, the control system 106 operates the cameras in a low-power mode (step 202), such as a standby or sleep mode where motion capture does not take place at all or a slow image-acquisition mode (e.g., with image-acquisition rates of five frames per second or less). This does not only reduce power consumption by the cameras, but typically also decreases the power consumption of the control and image-processing system 106, which is subject to a lower processing burden as a consequence of the decreased (or vanishing) frame rate. While the system is in low-power mode, the control system 106 monitors environmental illumination parameters like environmental brightness and/or reflectivity (step 204), either continuously or at certain intervals, based on readings from the sensor(s) 118.

As long as the brightness and/or reflectivity (whichever is monitored) does not change significantly (e.g., remains below the specified threshold), the system continues to be operated in low-power mode and the brightness/reflectivity continues to be monitored. Once a change in brightness and/or reflectivity is detected (step 206), the cameras (and associated image-processing functionality of the control and image-processing system 106) are switched into a high-frame-rate, high-power mode, in which motion of an object of interest 114 in the region of interest 112 is continuously tracked (step 208). Frame rates in this mode are typically at least 15 frames per second, and often several tens or hundreds of frames per second. Motion capture and tracking usually continues as long as the object of interest 114 remains within the region of interest 112. When the object 114 leaves the region 112 (as determined, e.g., by the image-processing system 106 based on the motion tracking in step 210), however, control system 206 switches the camera(s) back into low-power mode, and resumes monitoring the environment for changes in environmental illumination parameters like brightness and/or reflectivity. The method 200 can be modified in various ways. For example, in implementations where the cameras still capture images in the low-power mode, albeit at a low frame rate, any motion detected in these images may be used, separately or in conjunction with changes in one or more environmental illumination parameters such as environmental brightness or reflectivity, to trigger the wake-up of the system.

Figure 3:
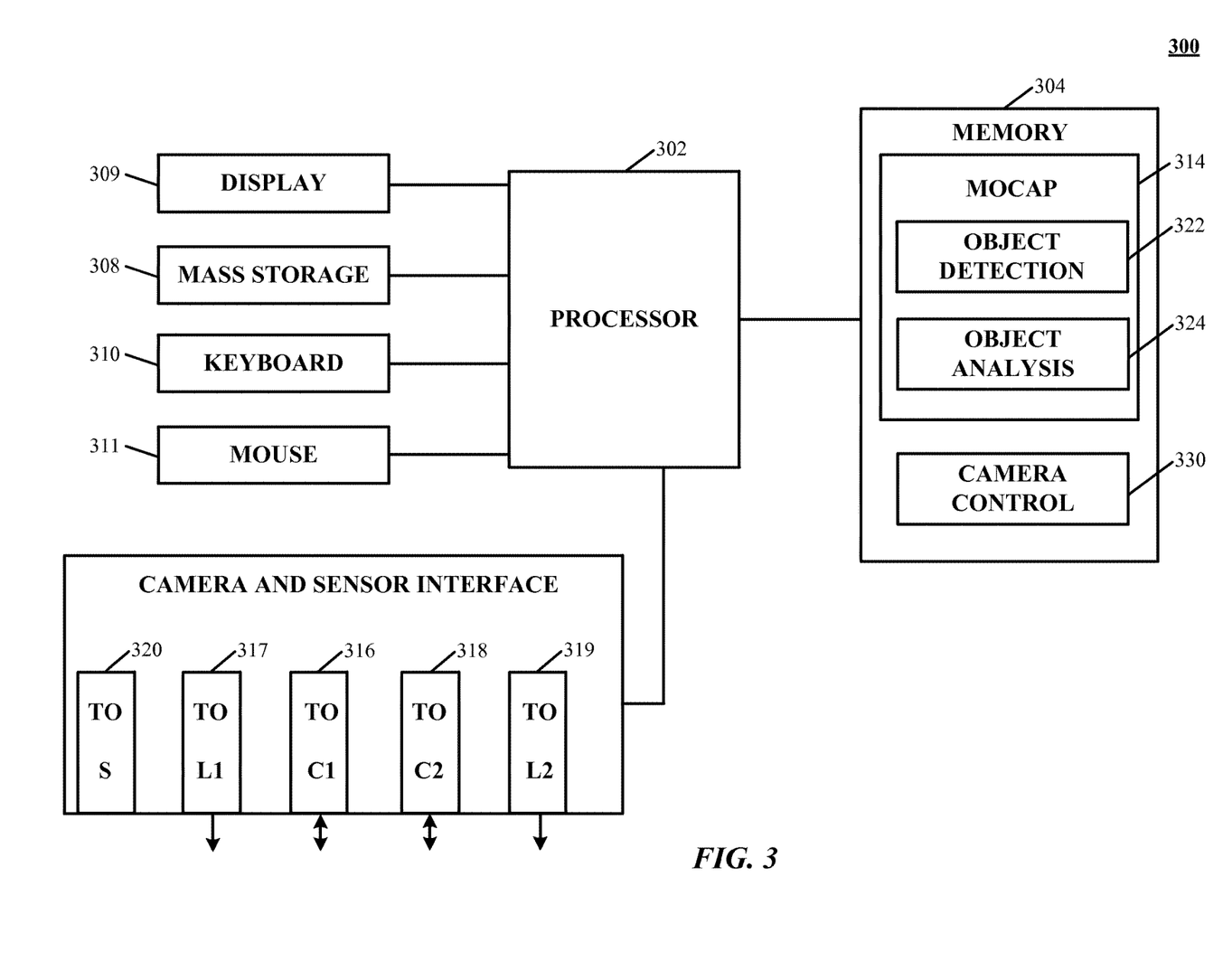
FIG. 3 is a block diagram of an example computer system for operating a motion-capture system with reduced power consumption.

FIG. 3 is a block diagram of an example computer system 300 for operating a motion-capture system with reduced power consumption. The control and image-processing system 106 may generally be implemented in software, hardware, or a combination of both; FIG. 3 illustrates an exemplary computer implementation in block-diagram form. The computer 300 includes a processor 302, a memory 304, a camera and sensor interface 306, one or more mass storage devices 308, a display 309, user input devices such as a keyboard 310 and a mouse 311, and a system bus (not shown) that facilitates communication between these components. The processor 302 may be a general-purpose microprocessor, but depending on implementation can alternatively be a microcontroller, peripheral integrated circuit element, a CSIC (customer-specific integrated circuit), an ASIC (application-specific integrated circuit), a logic circuit, a digital signal processor, a programmable logic device such as an FPGA (field-programmable gate array), a PLD (programmable logic device), a PLA (programmable logic array), an RFID processor, smart chip, or any other device or arrangement of devices that is capable of implementing the steps of the methods of the technology disclosed. The mass storage devices 308 may be removable or non-removable, volatile or non-volatile computer storage media. For example, a hard disk drive may read or write to non-removable, non-volatile magnetic media. A magnetic disk drive may read from or write to a removable, non-volatile magnetic disk, and an optical disk drive may read from or write to a removable, non-volatile optical disk such as a CD-ROM or other optical media. Other removable/non-removable, volatile/non-volatile computer storage media that can be used in the exemplary operating environment include, but are not limited to, magnetic tape cassettes, flash memory cards, digital versatile disks, digital video tape, solid state RAM, solid state ROM, and the like. The storage media are typically connected to the system bus through a removable or non-removable memory interface.

The camera and sensor interface 306 can include hardware and/or software that enables communication between computer system 300 and cameras such as cameras 102, 104 shown in FIG. 1, as well as associated light sources (such as light sources 108, 110) and sensors (such as sensor(s) 118) of FIG. 1. Thus, the camera interface 306 can, for example, include one or more data ports 316, 318 to which cameras can be connected, as well as hardware and/or software signal processors to modify data signals received from the cameras (e.g., to reduce noise or reformat data) prior to providing the signals as inputs to a motion-capture program 314 executing on the processor 302. In some implementations, the camera interface 206 can also transmit signals to the cameras, e.g., to activate or deactivate the cameras, to control camera settings (frame rate, image quality, sensitivity, etc.), or the like. Such signals can be transmitted, e.g., in response to control signals from processor 302, which may in turn be generated in response to user input or other detected events. Further, the interface 306 can include controllers 317, 319 to which light sources (e.g., light sources 108, 110) can be connected. In some implementations, the controllers 317, 319 supply operating current to the light sources, e.g., in response to instructions from the processor 302 executing the mocap program 314. In other implementations, the light sources can draw operating current from an external power supply (not shown), and the controllers 317, 319 can generate control signals for the light sources, e.g., instructing the light sources to be turned on or off or changing the brightness. In some implementations, a single controller can be used to control multiple light sources. Further, the interface 306 may include one or more sensor data ports 320 connected to and receiving data from the sensor(s) 118.

The memory 304 may be used to store instructions to be executed by the processor 302, as well as input and/or output data associated with execution of the instructions. In particular, the memory 304 contains instructions, conceptually illustrated as a group of modules, that control the operation of the processor 302 and its interaction with the other hardware components. An operating system directs the execution of low-level, basic system functions such as memory allocation, file management, and the operation of mass storage devices. The operating system may be or include a variety of operating systems such as Microsoft WINDOWS operating system, the Unix operating system, the Linux operating system, the Xenix operating system, the IBM AIX operating system, the Hewlett Packard UX operating system, the Novell NETWARE operating system, the Sun Microsystems SOLARIS operating system, the OS/2 operating system, the BeOS operating system, the MACINTOSH operating system, the APACHE operating system, an OPENSTEP operating system, iOS, Android or other mobile operating systems, or another operating system of platform.

At a higher level, the memory stores software applications implementing motion-capture and control in accordance herewith. These applications include, for example, the mocap program 314, which, when executed, performs motion-capture analysis on images supplied from cameras connected to the camera interface 306. In one implementation, the mocap program 314 includes various modules, such as an object detection module 322 and an object analysis module 324. The object detection module 322 can analyze images (e.g., images captured via camera interface 306) to detect edges of an object therein and/or other information about the object's location, and the object analysis module 324 can analyze the object information provided by the object detection module 322 to determine the 3D position and/or motion of the object. Examples of image-analysis methods for position determination and/or motion capture are described in U.S. patent application Ser. No. 13/414,485, filed on Mar. 7, 2012, and U.S. Provisional Patent Application No. 61/724,091, filed on Nov. 8, 2012, which are hereby incorporated herein by reference in their entirety. The memory 304 may also store a camera-control application 330, which receives, via the sensor data port(s) 320, a measured brightness or reflectivity signal, compares this signal against a specified threshold, and generates control signals for the cameras 102, 104 and/or the light sources 108, 110 and sensor(s) 118 based thereon. The control signals may, for example, serve to switch the cameras between low-power and high-power modes. Alternatively to being implemented in software, camera control may also be facilitated by a special-purpose hardware module integrated into computer system 300.

The display 309, keyboard 310, and mouse 311 can be used to facilitate user interaction with computer system 300. These components can be of generally conventional design or modified as desired to provide any type of user interaction. In some implementations, results of motion capture using the camera interface 306 and the mocap program 314 can be interpreted as user input. For example, a user can perform hand gestures that are analyzed using mocap program 314, and the results of this analysis can be interpreted as an instruction to some other program executing on processor 300 (e.g., a web browser, word processor, or other application). Thus, by way of illustration, a user might use upward or downward swiping gestures to "scroll" a webpage currently displayed on the display 308, to use rotating gestures to increase or decrease the volume of audio output from a speakers, and so on.

It will be appreciated that computer system 300 is illustrative and that variations and modifications are possible. Computer systems can be implemented in a variety of form factors, including server systems, desktop systems, laptop systems, tablets, smart phones or personal digital assistants, and so on. A particular implementation may include other functionality not described herein, e.g., wired and/or wireless network interfaces, media playing and/or recording capability, etc. In some implementations, one or more cameras may be built into the computer rather than being supplied as separate components. Further, an image-processing functionality can be implemented using only a subset of computer system components (e.g., as a processor executing program code, an ASIC, or a fixed-function digital signal processor, with suitable I/O interfaces to receive image data and output analysis results). Further, while computer system 300 is described herein with reference to particular blocks, it is to be understood that the blocks are defined for convenience of description and are not intended to imply a particular physical arrangement of component parts. Further, the blocks need not correspond to physically distinct components. To the extent that physically distinct components are used, connections between components (e.g., for data communication) can be wired and/or wireless as desired.

The terms and expressions employed herein are used as terms and expressions of description and not of limitation, and there is no intention, in the use of such terms and expressions, of excluding any equivalents of the features shown and described or portions thereof. In addition, having described certain implementations of the technology disclosed, it will be apparent to those of ordinary skill in the art that other implementations incorporating the disclosed implementation herein may be used without departing from the spirit and scope of the technology disclosed. For example, the systems and methods for reducing power consumption in accordance herewith are not limited to motion capture systems utilizing conventional edge detection or contrast-enhanced edge detection as specifically described, but are generally applicable to any motion capture system, regardless of the image-processing steps used to detect and track moving objects. Accordingly, the described implementations are to be considered in all respects as only illustrative and not restrictive.

What is claimed is:

1. A method of operating a motion-capture system having at least one camera to minimize power consumption while assuring high-quality motion capture to track motions of an object, the method including:

monitoring using an optically sensitive sensor-a region of interest including a field of view of the at least one camera of a motion-capture system; wherein the region of interest is set as a volume of approximately 1 meter in length and a light source positioned near the camera(s) of the motion-capture system to shine light onto the object thereby enabling objects of interest to be distinguished from background objects using falloff of light intensity with distance;

using the optically sensitive sensor, measuring brightness of light in a field of view of the at least one camera of the motion capture system at a first measurement and a second measurement conducted subsequent to the first measurement;

comparing brightness of light measured using the sensor at the second measurement and brightness of light measured using the sensor at the first measurement to determine a difference in brightness of light measured at first and second measurements;

determining that the difference in brightness of light measured using the sensor at first and second measurements exceeds a predetermined threshold indicating an object has entered the field of view of the at least one camera of the motion-capture system between the first measurement and the second measurement;

responsive to determining that the difference in brightness of light measured using the sensor at first and second measurements exceeds a predetermined threshold indicating an object has entered the field of view, (i) detecting subsequent motions of the object using the motion capture system; (ii) determining speed of the subsequent motions detected by the motion capture system, and (iii) switching the motion-capture system to operate in one of a set of intermediate modes, each intermediate mode having a rate of image capture different from a rate of image capture of other intermediate modes, the intermediate modes arranged between a low-power mode to a high-power mode; and repeating the (i) detecting, (ii) determining, and (iii) switching until the motion capture system determines that the object has left the region of interest, to reconstruct 3D motion of the object; thereby enabling the motion capture system to minimize power consumption while assuring high-quality motion capture to track motions of the object.

2. The method of claim 1, further including optically sensitive sensor monitoring environmental reflectivity in the region of interest.

3. The method of claim 2, wherein monitoring the environmental reflectivity further includes blinking a light source and measuring a brightness of a reflection signal using the optically sensitive sensor.

4. The method of claim 3, wherein the light source is turned off, dimmed, or blinked when the at least one camera operates in low-power mode.

5. The method of claim 1, further including setting a threshold so as to be indicative of at least one of presence or movement of an object or person in the region of interest.

6. The method of claim 1, further including setting a threshold so as to be indicative of geometric configuration of the region of interest.

7. The method of claim 1, further including switching the motion capture system into the low-power mode responsive to receiving a user's command.

8. The method of claim 1, further including successively decreasing processing of captured images in intermediate modes having successively reduced frame rates.

9. The method of claim 1, further including monitoring brightness in the region of interest at certain time intervals when in lowest power mode.

10. The method of claim 1, further including tracking objects moving in the region of interest using a frame rate of several tens or hundreds of frames per second at a high power mode.

11. The method of claim 1, further including evaluating images captured by the at least one camera in low-power mode for presence or movement of an object of interest dependent on distinguishing object pixels from background pixels by applying a brightness threshold to each image pixel.

12. The method of claim 1, further including filtering out visible light so that only infrared light is registered in images captured by cameras of the motion capture system.

13. The method of claim 1, wherein the low-power mode is a standby or sleep mode during which motion capture does not take place.

14. A non-transitory computer readable medium storing instructions for operating a motion-capture system having at least one camera to minimize power consumption while assuring high-quality motion capture to track motions of an object, the instructions when executed by one or more processors perform:

monitoring using an optically sensitive sensor, a region of interest including a field of view of the at least one camera of a motion-capture system; wherein the region of interest is set as a volume of approximately 1 meter in length and a light source positioned near the camera(s) of the motion-capture system to shine light onto the object thereby enabling objects of interest to be distinguished from background objects using falloff of light intensity with distance;

using the optically sensitive sensor, measuring brightness of light in a field of view of the at least one camera of the motion capture system at a first measurement and a second measurement conducted subsequent to the first measurement;

comparing brightness of light measured using the sensor at the second measurement and brightness of light measured using the sensor at the first measurement to determine a difference in brightness of light measured at first and second measurements;

determining that the difference in brightness of light measured using the sensor at first and second measurements exceeds a predetermined threshold indicating an object has entered the field of view of the at least one camera of the motion-capture system between the first measurement and the second measurement;

responsive to determining that the difference in brightness of light measured using the sensor at first and second measurements exceeds a predetermined threshold indicating an object has entered the field of view, (i) detecting subsequent motions of the object using the motion capture system; (ii) determining speed of the subsequent motions detected by the motion capture system, and (iii) switching the motion-capture system to operate in one of a set of intermediate modes, each intermediate mode having a rate of image capture different from a rate of image capture of other intermediate modes, the intermediate modes arranged between a low-power mode to a high-power mode; and repeating the (i) detecting, (ii) determining, and (iii) switching until the motion capture system determines that the object has left the region of interest, to reconstruct 3D motion of the object; thereby enabling the motion capture system to minimize power consumption while assuring high-quality motion capture to track motions of the object.

15. A motion-capture system, including:

at least one camera for capturing images of an object within a field of view thereof;

an image-analysis module comprising a processor coupled to a memory storing instructions that, when executed by the processor, track motion of the object based on the images and interprets as input a user's hand gestures tracked;

an optically sensitive sensor for measuring brightness of light within the field of view of the at least one camera at a first measurement and a second measurement subsequent to the first measurement; and a control module comprising a processor coupled to a memory storing instructions that, when executed by the processor, perform:

monitoring using the optically sensitive sensor, a region of interest including a field of view of the at least one camera of a motion-capture system; wherein the region of interest is set as a volume of approximately 1 meter in length and a light source positioned near the camera(s) of the motion-capture system to shine light onto the object thereby enabling objects of interest to be distinguished from background objects using falloff of light intensity with distance;

using the optically sensitive sensor, measuring brightness of light in a field of view of the at least one camera of the motion capture system at a first measurement and a second measurement conducted subsequent to the first measurement;

comparing brightness of light measured using the sensor at the second measurement and brightness of light measured using the sensor at the first measurement to determine a difference in brightness of light measured at first and second measurements;

determining that the difference in brightness of light measured using the sensor at first and second measurements exceeds a predetermined threshold indicating an object has entered the field of view of the at least one camera of the motion-capture system between the first measurement and the second measurement;

responsive to determining that the difference in brightness of light measured using the sensor at first and second measurements exceeds a predetermined threshold indicating an object has entered the field of view, (i) detecting subsequent motions of the object using the motion capture system; (ii) determining speed of the subsequent motions detected by the motion capture system, and (iii) switching the motion-capture system to operate in one of a set of intermediate modes, each intermediate mode having a rate of image capture different from a rate of image capture of other intermediate modes, the intermediate modes arranged between a low-power mode to a high-power mode; and repeating the (i) detecting, (ii) determining, and (iii) switching until the motion capture system determines that the object has left the region of interest, to reconstruct 3D motion of the object; thereby enabling the motion capture system to minimize power consumption while assuring high-quality motion capture to track motions of the object.

* * * * *

UNITED STATES PATENT AND TRADEMARK OFFICE
CERTIFICATE OF CORRECTION

PATENT NO.        : 10,609,285 B2
APPLICATION NO.   : 14/149663
DATED             : March 31, 2020
INVENTOR(S)       : David Holz

Page 1 of 1

It is certified that error appears in the above-identified patent and that said Letters Patent is hereby corrected as shown below:

In the Claims

In Claim 1, Line 34, replace "sensor-a" with -- sensor, a --.

Signed and Sealed this
Thirtieth Day of June, 2020

Andrei Iancu
*Director of the United States Patent and Trademark Office*